United States Patent [19]
Broxterman et al.

[11] Patent Number: 6,058,467
[45] Date of Patent: May 2, 2000

[54] STANDARD CELL, 4-CYCLE, 8-BIT MICROCONTROLLER

[75] Inventors: David Broxterman, Plano; Stephen D. Sandelin, Frisco, both of Tex.

[73] Assignee: Dallas Semiconductor Corporation, Dallas, Tex.

[21] Appl. No.: 09/130,773

[22] Filed: Aug. 7, 1998

[51] Int. Cl.[7] .................................................. G06F 9/35
[52] U.S. Cl. .......................................... 712/32; 712/247
[58] Field of Search ........................... 712/32, 210, 230, 712/247

[56] References Cited

U.S. PATENT DOCUMENTS

| | | | |
|---|---|---|---|
| 4,339,797 | 7/1982 | Brereton | 710/128 |
| 4,398,244 | 8/1983 | Chu et al. | 364/200 |
| 4,434,461 | 2/1984 | Puhl | 364/200 |
| 4,835,738 | 5/1989 | Niehaus et al. | 364/900 |
| 4,857,770 | 8/1989 | Partovi et al. | 307/451 |
| 4,864,162 | 9/1989 | Maoz | 307/296.1 |
| 4,868,735 | 9/1989 | Moller et al. | 364/200 |
| 4,890,263 | 12/1989 | Little | 365/218 |
| 4,945,469 | 7/1990 | Yamada | 364/200 |
| 4,947,477 | 8/1990 | Little | 364/200 |
| 4,959,774 | 9/1990 | Davis | 714/6 |
| 5,235,548 | 8/1993 | Kurkowski | 365/200 |
| 5,269,012 | 12/1993 | Nakajima | 395/425 |
| 5,287,309 | 2/1994 | Kai | 365/189.04 |
| 5,473,271 | 12/1995 | Little et al. | 327/108 |

OTHER PUBLICATIONS

Mano, M. Morris, *Computer System Architecture*, 1982, pp. 228–283.

*Primary Examiner*—Eric Coleman
*Attorney, Agent, or Firm*—Jenkens & Gilchrist, a Professional Corporation

[57] ABSTRACT

An 8051 instruction set compatible microcontroller utilizing four or less clock cycles per machine cycle. The microcontroller is designed utilizing standard hardware design language techniques (HDL) and standardized cells. The microcontroller uses both a standard 8051 style special function register and a duplicate register to perform instructions requiring indirect memory accessing.

13 Claims, 4 Drawing Sheets

STANDARD CELL, 4-CYCLE, 8-BIT MICROCONTROLLER

BACKGROUND OF THE INVENTION

1. Field of the Invention

This invention relates to integrated circuits, microcontrollers, microprocessors and microcomputers. More particularly, to an 8-bit microcontroller integrated circuit that is designed using standard cell design techniques. Even more particularly, the present invention relates to an 8-bit microcontroller which utilizes an 8051 style instruction set, performs instructions in fewer clock cycles and is designed using standard HDL language and/or standardized design cells.

2. Description of Related Art

The constant demand for higher performance from computers generally, and microcontrollers and microprocessors in particular has led to various enhancements to these devices. Some enhancements have increased the clock speed and simplified the instruction sets. Higher clock rates imply less time required to perform an instruction, but multiple step operations would still require multiple clock cycles to perform an instruction. Thus, there is a need to improve a microcontroller or microprocessor design by decreasing the number of clock cycles necessary for performing a particular instruction in order to substantially decrease processing time.

Furthermore, designs for higher performance microcontrollers and microprocessors have required "custom" circuitry to be designed into silicon circuitry. The custom circuitry increases design, fabrication and circuit debugging time. Thus, there is a need for a higher performance microcontroller or microprocessor that utilizes standardized circuit cell designs instead of requiring non-standard custom circuitry designs.

SUMMARY OF THE INVENTION

An 8051 instruction set compatible microcontroller utilizing four or less clock cycles per machine cycle. The microcontroller is designed utilizing standard hardware design language techniques (HDL) and standardized cells. The microcontroller uses both a standard 8051 style special function register and a duplicate register to perform instructions requiring indirect memory accessing.

BRIEF DESCRIPTION OF THE DRAWINGS

Various objects and advantages will become apparent and readily appreciated from the following description of the presently preferred exemplary embodiments taken in conjunction with the accompanying drawings, of which.

DETAILED DESCRIPTION OF THE PREFERRED EXEMPLARY EMBODIMENTS

An exemplary embodiment of the present invention is a high speed microcontroller. The microcontroller is preferably an 8-bit microcontroller which would be substantially compatible with the 8051 family of microcontroller devices. Unlike former 8-bit 8051 family microcontrollers the present preferred exemplary microcontroller is designed to perform instructions in no-more than four clock cycles per instruction. (Former 8051 family micros required 12 clock cycles to perform an instruction.)

The present exemplary embodiment also is designed utilizing standardized HDL (Hardware Definition Language) cells. Standardized design cells decrease the overall design, manufacture and testing times required to get a product to market. By using standardized HDL cells, the manufacturing process of the present invention is greatly simplified. No detailed schematics need to be created and the manufacturing process can be almost completely automated. Utilizing HDL design techniques lowers the cost of manufacturing the microprocessor, gets the microprocessor to market more quickly, and allows the device to be manufactured at virtually any fabrication facility capable of interpreting an HDL programming code.

In the present exemplary embodiments wasted clock and memory cycles of former 12 cycle 8051 processors have been removed by utilizing a redesigned processor core. As a result, every 8051 instruction is executed between 1.5 and 3 times faster than a 12 cycle device for the same crystal speed. Typical applications will see a speed improvement of 2.5 times utilizing the same code and the same crystal. This is due to the exemplary device requiring fewer clock cycles to each machine cycle.

Figure 1:
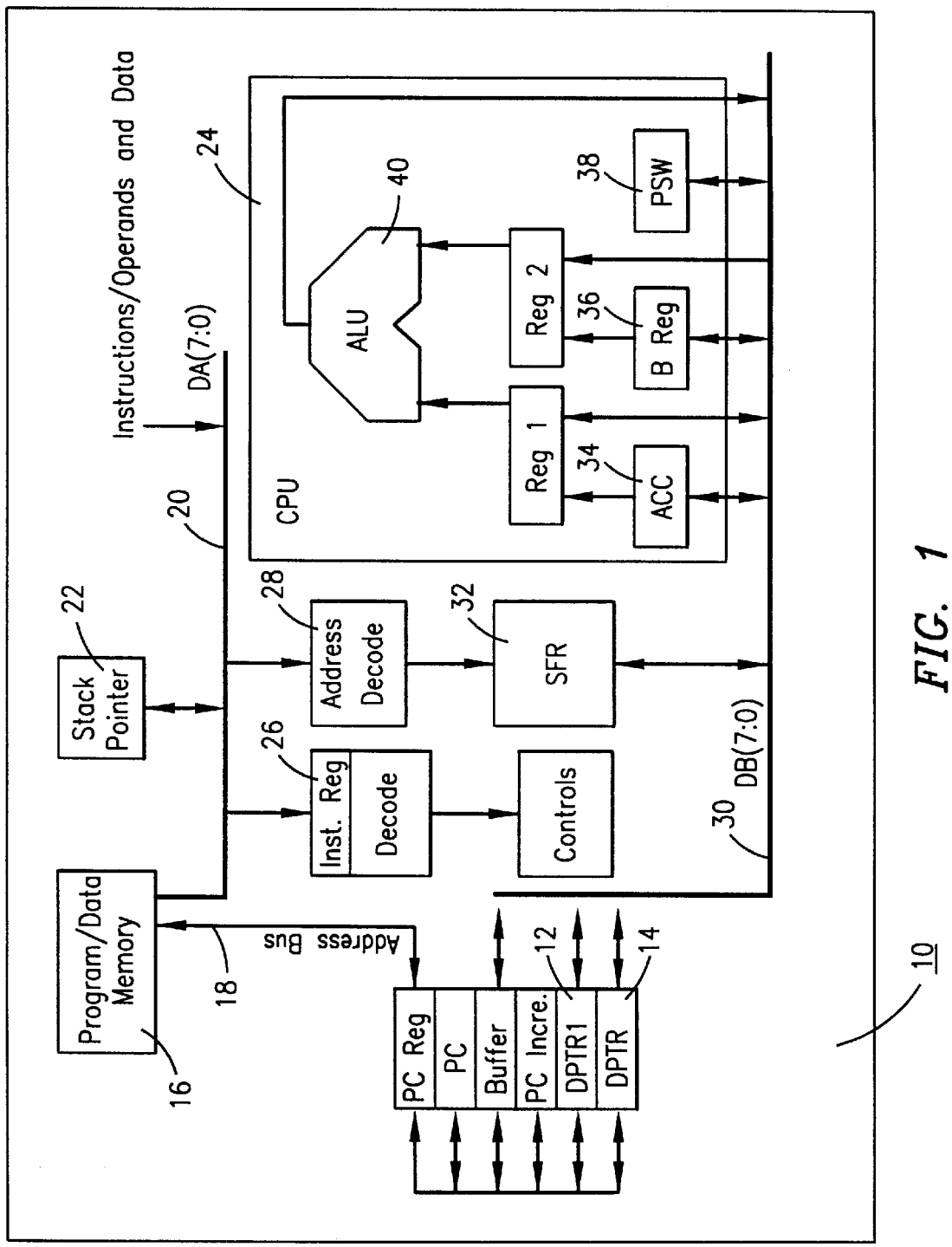
FIG. 1 depicts a block diagram of an exemplary microcontroller core.

FIG. 1 depicts an exemplary 8051 family micro core 10 utilizing the exemplary embodiment of the present invention. Two data pointers (DPTR 12 and DPTR 14) are used to aid in pointing to data memory. The present invention could operate with a single data pointer, but two are preferred. Program and data memory 16 are connected to an address bus 18 so that the data pointers 12, 14 can address the memory locations. The 8-bit DA bus 20 (Data A bus) provides instructions, operands, SFR address, data and items from the stack pointer 22 to the CPU 24 via the instruction register 26 and address decode circuitry 28. The DB bus 30 (Data B bus) carries data and instructions to and from the CPU circuitry 24.

Peripherals and operands that are not specific microcontroller core instructions are controlled via the special function registers 32 (SFRs). The accumulator circuitry 34 (ACC) is the primary register used in the CPU portion 24 of the microcontroller core 10. The accumulator 34 is the source or destination of many operations. The B-register register 36 can be used as a second 8-bit argument in multiply and divide operations. When the B-register 36 is not used for multiply and divide functions, it can be used as a general purpose register.

The program status word register 38 (PSW) is used to store a variety of bit flags which include the carry flag, auxiliary carry flag, general purpose flag, register bank select, overflow flag, and parity flag.

The data pointer DPTR1 and DPTR 12, 14 are used as the source for the memory address for the MOVX instruction. As stated above, in the preferred embodiment's two pointers are provided as the source and destination address when moving data from one memory area to another memory area or to a memory mapped peripheral.

FIG. 1 depicts three busses that are internal to the processor core. The address bus 18 is preferably a 20-bit address bus. The DA 20 and DB 30 busses are each 8-bit data buses. The DA bus 20 is used to address the SFRs 32, to fetch instructions and operands from the external memory and to provide for the internal stack. The DB data bus 30 is generally used for data exchange between SFRs 32 and the output of all ALU operations 40.

The special function registers 32 (SFRs) provide software control of predetermined peripheral functions that are not explicitly controlled by instructions within the microcontroller core 10. In many cases, a SFRs 32 will control individual functions or report the function's status. The SFRs 32 are generally only accessible via register direct addressing.

All standard SFR locations from 8051 standard requirements are duplicated in the exemplary microcontroller core 10. Furthermore, the present exemplary microcontroller may have additional SFRs to provide for unique functionality and features and still maintain the complete standard 8051 instruction set and hardware compatibility.

Figure 2:
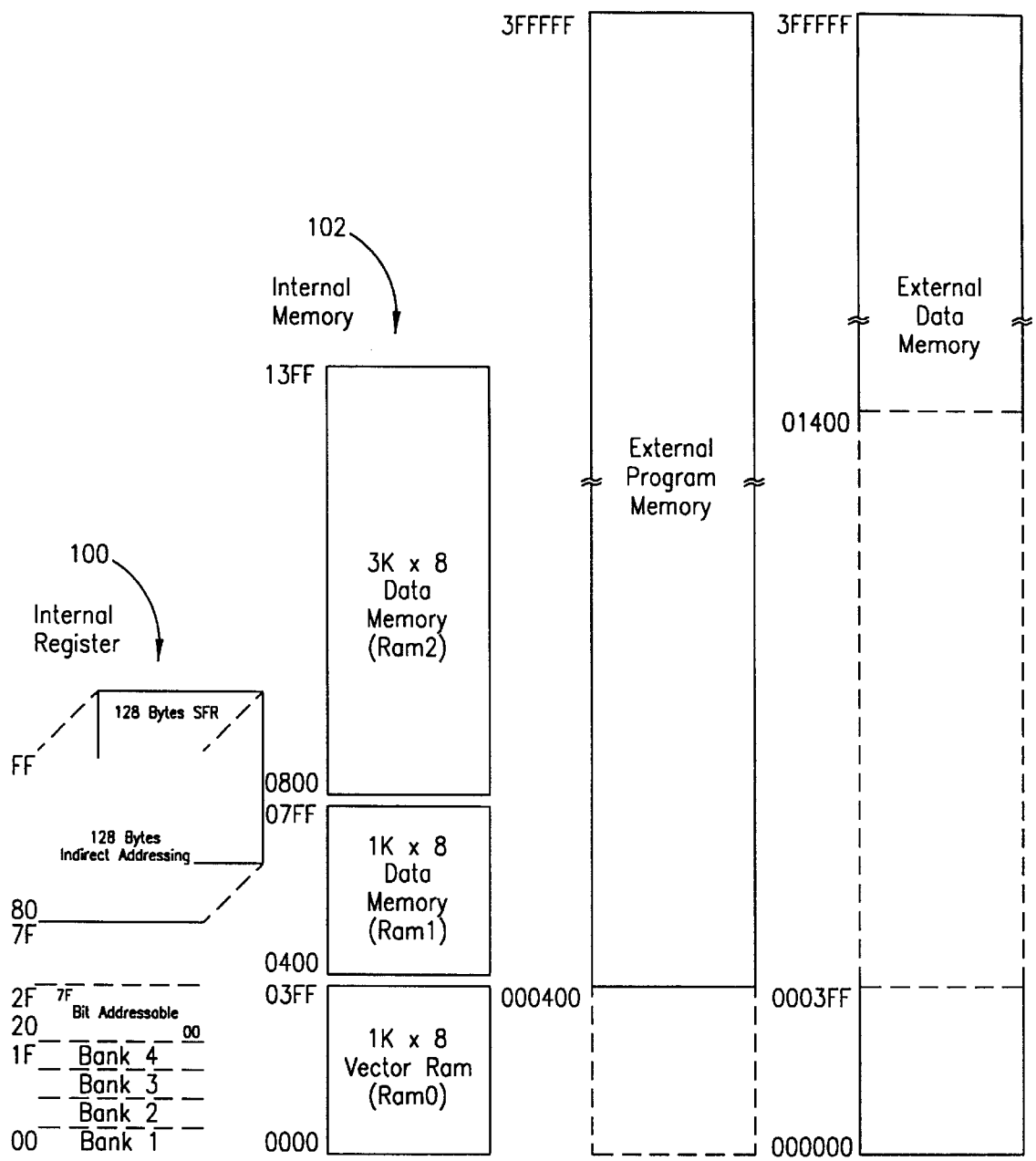
FIG. 2 depicts a diagram of a memory map associated with the present exemplary microcontroller.

Referring now to FIG. 2, there are three distinct memory areas in the exemplary microcontroller, namely registers 100, program memory, and data memory 102. All registers are located on the integrated circuit. The program and data memory may be on-chip, off-chip 104, or a mixture of both on and off-chip. The present embodiment of the preferred microcontroller utilizes a memory addressing scheme that separates program memory from data memory. The program and data segments (addresses) can be overlapped since they are accessed in different ways.

As shown in FIG. 2, the 5K internal RAM 102, preferably SRAM, provides internal programming space, a large stack, and data memory spaces to support high speed operations. The memory function of the on-chip SRAM is user selectable except the bottom 1K area (RAM0) which is used as the vector RAM area. The vector RAM can be considered the first 1K of program memory space to store reset and interrupt vectors for security enhancement options. The internal stack is preferably located in the next 1K of on-chip SRAM area (RAM1) when the exemplary microcontroller is in a 10-bit extended stack mode. If the stack is configured to be in a generic 8051 mode, then the program stack is restricted to the scratchpad area. The remaining 3K on-chip SRAM (RAM 2) is defaulted for use with mathematical memory data space for arithmetic operations.

The preferred exemplary microcontroller may provide a byte-wide bus interface to support external program/data memories. The byte-wide bus may be a demultiplexed 20-bit address and 8-bit data bus with 8 programmable chip enables for various size external SRAM, FLASH or other RAM memories. The byte-wide data bus may be an encrypted data bus.

The internal register 100 is very important in the present exemplary embodiment because standard cell registers are incorporated into the present design to decrease the number of clock cycles required to perform a MOV command via indirect addressing techniques (when compared to prior art 8051 microcontroller architecture). Registers are located in the 256 bytes of on-chip RAM that are divided into two sub-areas of 128 bytes each 100 shown in FIG. 2. A separate class of instructions is used to access the registers and the data memory. The upper 128 bytes of Scratchpad RAM are overlapped with 128 bytes of special Function Registers in the memory map. See FIGS. 2 and 3. Preferably, the upper 128 bytes of Scratchpad RAM are accessed by indirect addressing and the special function register (SFR) area is accessed by direct addressing. The lower 128 bytes of Scratchpad on-chip RAM can be accessed by direct or indirect addressing.

In the lower 128 bytes of Scratchpad RAM, there are four banks of eight working registers in each bank 300. The working registers are general purpose RAM locations that can be addressed within the selected bank by any instructions that use R0–R7. The register bank selection is controlled via a program status register in the CPU area. The contents of the working registers 0 and 1 can be used for indirect addressing in at least the upper 128 bytes 302 of Scratchpad RAM.

In the present exemplary embodiment, the use of banks 0 through 3 (or 1 through 4) are used extensively to perform indirect memory addressing. In the 8051 microcontroller instruction set, there are instructions that allow access to the upper 128 byte memory array. An important detail is that, generally to access the upper 128 bytes of memory, only indirect instructions can be used. Thus, if a user wanted to perform any operation on the upper 128 bytes of the memory he would have to use an indirect instruction. Below are examples of some indirect instructions used by an exemplary microcontroller that are indirect instructions:

INC @ Ri
DEC @ Ri
MOV direct, @ Ri
MOV @ Ri, A
MOV @ Ri, direct
MOV @ Ri, # data
MOVC A, @ A+DPTR
MOVX @ Ri, A
XCH A, direct
XCH A, @ Ri
XCHD A, @ Ri To digress for a moment, instructions, whether direct or indirect instructions are performed in a certain number of machine cycles. Each machine cycle takes a certain number of clock cycles to complete. In the original 8051 microcontroller, manufactured by Intel, one machine cycle takes twelve clock cycles to complete. Thus, if an instruction takes two machine cycles to perform, then it would take twenty-four clock cycles. Speeding up the clock may increase the speed of the microcontroller, but a limiting factor will always be the number of clock cycles per machine cycle.

Figure 3:
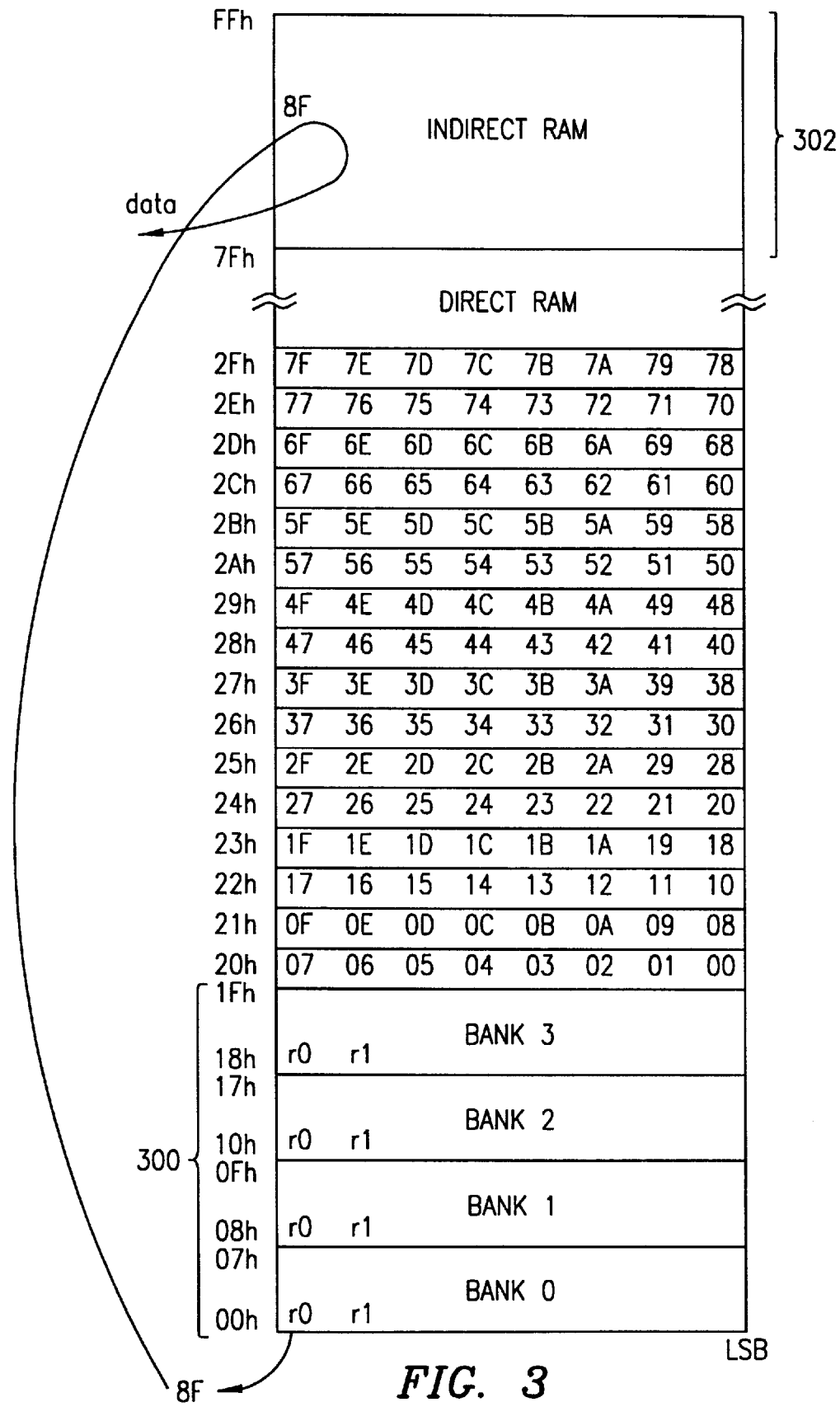
FIG. 3 depicts an exemplary portion of on-chip memory.

In the present exemplary embodiment the number of clock cycles per machine cycle is decreased to four. This, of course, leaves less time in a machine cycle. For example, in prior art 8051 microcontrollers there was enough time to perform two RAM reads in an indirect memory access instruction. In the present invention, with only four clock cycles to a machine cycle there is only enough time to perform one RAM read in an indirect memory access instruction. Thus, the present invention overcomes this dilemma by utilizing banks 0 through 3 as shown in FIG. 3. Bank 0 through 3 are working registers which store R0 and R1. R0 and R1 are standard terms for working registers in an 8051 microcontroller design. The working registers are part of the lower 120 bytes of RAM. There are 4 banks with 8 working registers. The working registers are general purpose RAM locations that can be addressed. The 8 working registers are designated as R0 through R7 and are selected by using the R0 through R7 designation.

An indirect instruction, in general prior art terms, requires two memory reads. Basically, the contents of the R0 and R1 working registers found in one of the four RAM banks (see FIG. 3) is read. The value read from the R0 and R1 bank is used as a RAM address. The RAM address holds the data that needs to be manipulated. Thus, a read of the RAM address must be performed. Hence, it appears that two reads must be performed to complete the indirect instruction, but there is not enough time to perform two reads in the number of machine cycles allowed in the 8051 instruction set when there are only four clock cycles per machine cycle.

Figure 4:
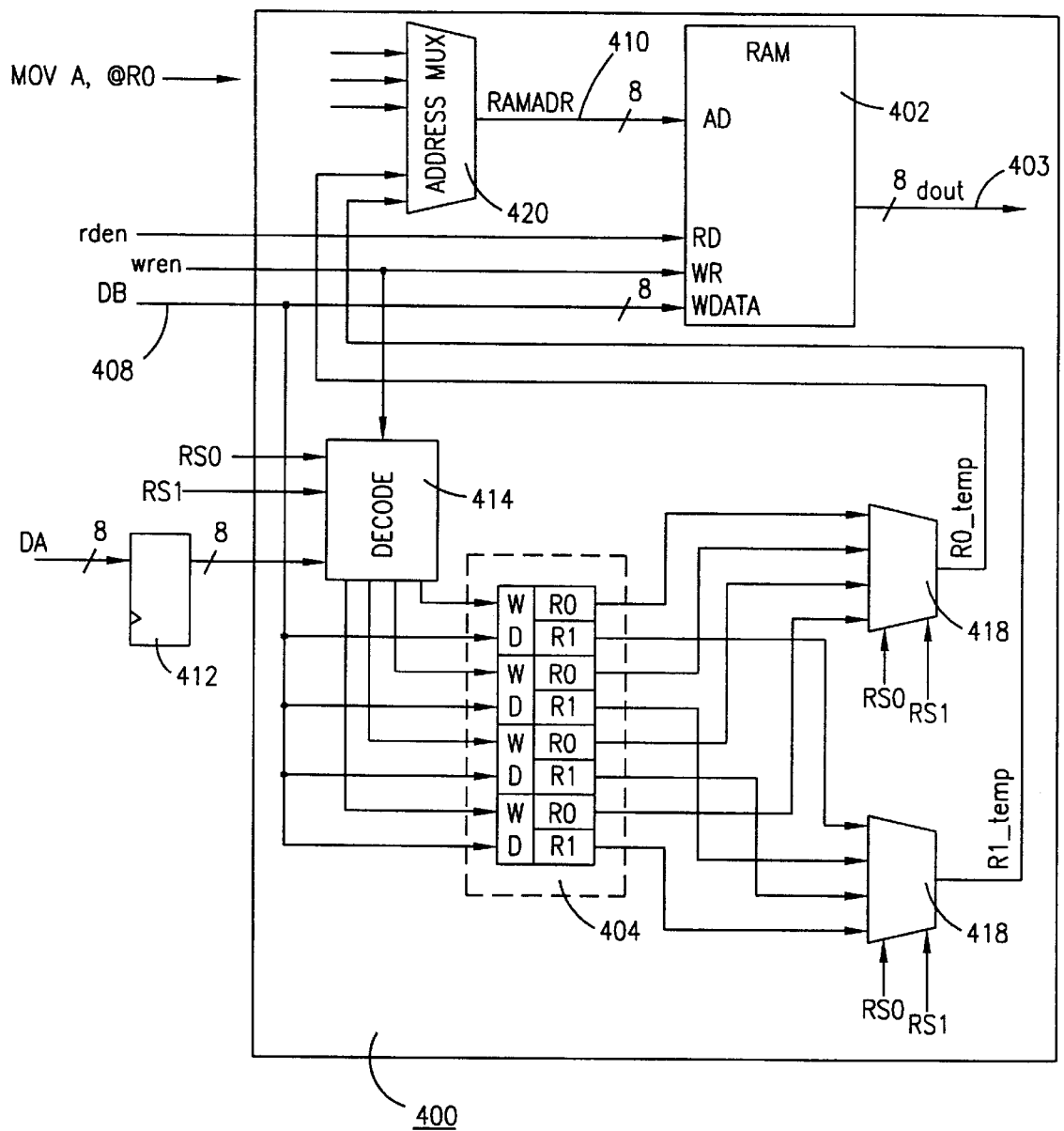
FIG. 4 is a circuit diagram of a portion of an exemplary microcontroller.

In the present embodiments, a new technique for performing the appropriate reads was established such that the design could be implemented using a standard hardware Design Language (HDL) programming such as Verilog, or VHDL. Refer now to FIG. 4, wherein an exemplary HDL compatible design for handling indirect addressing in a single RAM read is depicted. A design that utilizes "off the shelf" standardized integrated circuit cells allows the resulting device to be manufactured more inexpensively than a customized device and allows the resulting microcontroller design to be manufactured at virtually any integrated circuit manufacturer. This is a huge advantage over specialized or custom integrated circuit design.

Referring to FIG. 4, an exemplary hardware design 400 for decreasing the number of RAM reads from two to one read during an indirect addressing instruction is depicted. The design 400 provides an advantageous technique for performing indirect addressing of a memory location in an 8051 style microcontroller core. This, or a substantially equivalent circuit, may work in other types of microcontrollers and microprocessors. In FIG. 4, the RAM 402 is a standard cell RAM. Generally, a standard cell RAM does not provide direct access to any of the memory cells. In general, the memory cells of the standard cell RAM 402 must be addressed and do not have direct access via hard wiring. The RAM 402 is set up in a similar manner as the memory shown in FIG. 3. That is, there is a portion of the memory having Banks 0, 1, 2 and 3 wherein the working registers are located.

In the exemplary embodiment the working registers are duplicated as latches or flip-flops outside the RAM 104. The latches or flip-flops can be any standardized cell that would represent RAM such as an 8×8 memory cell a series of flip-flops, etc. The duplicate RAM locations 404 could be called shadow registers or cache registers.

The decode circuit receives the RS0 and RS1 signals along with a latched value from the DA bus (data A Bus) 408. The DA bus is an 8-bit bus. The address bus, such as ramadr 410 is also an 8-bit bus. The decode 414 determines, based on the RS0 and RS1 signals, whether any of the 8 duplicate registers 404 need to be accessed and which of the 8 duplicate working registers 404 the data should be written to. For example, if any of the RAM locations 00, 01, 08, 09, 10, 11, 18 or 19 (see HDL code, section D, below). When one of the designated addresses is detected by the decode and a 'write' is being performed, the data that is being written from the data bus DB 408 into the RAM 402 is also written into the appropriate duplicate register in the duplicate RAM locations 404. Thus, there are two locations that store the same data. Note that the designated RAM locations in the RAM 402 which are duplicated could be any RAM location and is not limited to that which is defined in the HDL code below. The duplicate registers 404 could conceivably duplicate the entire RAM 402 and thereby would allow a user to perform an indirect instruction with only one 'read' for any location in the RAM rather than being limited to the R0 and R1 duplicate registers.

The duplicate registers 404 are used when an indirect instruction associated with a RAM location is to be stored in a duplicate register. For example, referring to FIGS. 3 and 4, if an indirect instruction required that R0 of Bank 0 was to be read and the data in R0 is used as address 8F. Then, the prior art technique would require two reads, one of the R0 register and a second read of the RAM address. In the present exemplary embodiments only one read of the RAM would be required to perform an indirect instruction because the duplicate RAM location 404 contains the same information as in the RAM 404.

An example of an indirect instruction could be MOV A, @ R0 (move to the accumulator indirect). At this time it is assumed that the duplicate RAM and the RAM already have duplicate data stored. The decode circuitry 414 would have already received a write enable (wren) and data from data bus DB and an appropriate address via data bus DA. The duplicate RAM 404 and the RAM 402 would have the same data stored in correlated locations. In response to an instruction requiring indirect MOV instruction for example, the decode circuit 414 would receive the RS1 and RS0 signals along with the address latched in the latch 412 from the DA bus. The decode circuit 414 would decode the instruction as an indirect instruction. The duplicate memories 404 would then provide the address via muxes 418 and 420 to be read from the RAM 402 and the proper data would then be output via the dout lines 403. This indirect instruction can be performed in less clock cycles because the same memory array is not being addressed twice. Instead the RAM 402, a first memory array, and the duplicate RAM 404, a second memory array, are addressed separately. The whole process can be performed in less time and less clock cycles than that required to address the same memory array twice.

There is no requirement that the RAM 402 be ported RAM or contain special "custom" circuitry. Instead, the whole exemplary microcontroller can be designed utilizing standardized design cells. In fact the entire design can be written is HDL, VHDL, VERILOG or virtually any hardware or semiconductor circuitry design language. The code can be compiled to manufacture silicon chips using 0.6 micron, 0.5 micron or "whatever" silicon design technology.

The RAM Block 402 portion can be any standard RAM from any silicon manufacturer. The preferred exemplary embodiment utilizes asynchronous RAM, but one of ordinary skill in the art could also utilize synchronous, single port, dual port or other RAM variations such as Flash, Static, dynamic, etc.

Below is an exemplary HDL program in Verilog® HDL which defines the exemplary RAM and hardware related to the indirect instruction capabilities of the present invention. Portions of the program are marked with letters A, B, C, D, etc. The lettered sections of the program generally define different sections the circuit in FIG. 4.

```
G-----
module ram_top(DB,DATMP_ENB,RESET,XTKL,B1,BIT_ADR,
    C1,C2,C3,C4,DA,ESPDA,DARMRN,DBRM,DIR_ADR,DIR_RD,
    DIR_WRT,EXRD,EXWR,MOVC,RMDB,RS0,RS1);
input DATMP_ENB,RESET,XTKL,B1,BIT_ADR,C1,C2,C3,C4,
    ESPDA,DARMRN,DBRM,DIR_ADR,DIR_RD,DIR_WRT,EXRD,
    EXWR,MOVC,RMDB,RS0,RS1;
inout [7:0] DB;
input [7:0] DA;
reg [7:0] r0_1, r0_2, r0_3, r0_4, r1_1, r1_2, r1_3, r1_4;
reg [7:0] adr_mux, ramadr, r0adr, r1adr, dal, r0_temp,
    r1_temp;
reg [2:0] sel_adr;
wire [7:0] RAMOUT;
reg lat1, tmp1;
wire rden, wren, en_dal, en_lat1, settmp1, clrtmp1, lat_adr,
    ec1, ec3;
include
"/nova/usr2/sandelin/verilog/micro_work/libraries/glfuncs.v"
H-----
assign #1 en_dal = !(!(C1 && DATMP_ENB) && tmp1);
assign #1 en_lat1 = (C1 && !DIR_ADR);
```

```
-continued assign #1 rden = !((C2 && (B1 || (!DIR_RD && !lat1))) || (C4
     && !RMDB));
assign #1 wren = !(C4 && (!DBRM || (!DIR_WRT && !lat1)));
assign #1 ec1 = !(!B1 && DIR_ADR);
assign #1 ec3 = !(ESPDA && DARMRN);
assign #1 lat_adr = (C1 && ec1) || (C3 && ec3);
I-----
assign #5 DB[0] = BUS_NOR(rden, RAMOUT[0]);
assign #5 DB[1] = BUS_NOR(rden, RAMOUT[1]);
assign #5 DB[2] = BUS_NOR(rden, RAMOUT[2]);
assign #5 DB[3] = BUS_NOR(rden, RAMOUT[3]);
assign #5 DB[4] = BUS_NOR(rden, RAMOUT[4]);
assign #5 DB[5] = BUS_NOR(rden, RAMOUT[5]);
assign #5 DB[6] = BUS_NOR(rden, RAMOUT[6]);
assign #5 DB[7] = BUS_NOR(rden, RAMOUT[7]);
L-----
assign settmp1= !(MOVC && EXRD && EXWR);
assign clrtmp1= RESET || (C2 && B1);
// synopsys async_set_reset "settmp1,clrtmp1"
always @(settmp1 or clrtmp1)
  case(1'b1) // synopsys parallel_case
    settmp1:
      tmp1 = 1'b1;
    clrtmp1:
      tmp1 = 1'b0;
  endcase
always @(en_dal or DA)
  if(en_dal)
    dal <= #1 DA;
// synopsys async_set_reset "XTKL"
always @(en_lat1 or XTKL or DA)
  if(!XTKL)
    lat1 <= #1 1'b1;
  else if(en_lat1)
    lat1 <= #1 DA[7];
A-----
always @(ESPDA or DIR_ADR or BIT_ADR or dal)
  if(!DIR_ADR && !BIT_ADR)
    sel_adr <= #1 3'b101;
  else if((!DIR_ADR || !ESPDA) && BIT_ADR)
    sel_adr <= #1 3'b100;
  else if(ESPDA && DIR_ADR && BIT_ADR && !dal[3] && dal[2]
    && dal[1] && dal[0])
    sel_adr <= #1 3'b011;
  else if(ESPDA && DIR_ADR && BIT_ADR && !dal[3] && dal[2]
    && dal[1] && !dal[0])
    sel_adr <= #1 3'b010;
  else if(ESPDA && DIR_ADR && BIT_ADR && dal[7] &&
    dal[6] && dal[5] &&
      !dal[3] && !dal[2] && dal[1])
    sel_adr <= #1 3'b001;
  else
    sel_adr <= #1 3'b000;
B------
always @(RS0 or RS1 or r0_1 or r0_2 or r0_3 or r0_4 or r1_1
  or r1_2 or
    r1_3 or r1_4)
  case({RS1,RS0}) // synopsys parallel_case
    2'b00: begin
      r0_temp <= #1 r0_1; // select bank 1
      r1_temp <= #1 r1_1;
    end
    2'b01: begin
      r0_temp <= #1 r0_2; // select bank 2
      r1_temp <= #1 r1_2;
    end
    2'b10: begin
      r0_temp <= #1 r0_3; // select bank 3
      r1_temp <= #1 r1_3;
    end
    2'b11: begin
      r0_temp <= #1 r0_4; // select bank 4
      r1_temp <= #1 r1_4;
    end
  endcase
C-----
always @(sel_adr or RS0 or RS1 or DA or dal or r0_temp or
  r1_temp)
  case(sel_adr) // synopsys parallel_case
    3'b000:
      adr_mux <= #1 {3'b000,RS1,RS0,dal[2:0]};
    3'b001:
      adr_mux <= #1 {3'b000,RS1,RS0,2'b00,dal[0]};
    3'b010:
      adr_mux <= #1 r0_temp; // bank(1,2,3,4) - R0
    3'b011:
      adr_mux <= #1 r1_temp; // bank(1,2,3,4) - R1
    3'b100:
      adr_mux <= #1 DA;
    3'b101:
      adr_mux <= #1 {4'b0010,DA[6:3]};
    default:
      adr_mux <= #1 8'hxx;
  endcase
E-----
always @(lat_adr or XTKL or adr_mux)
  if (!XTKL)
    ramadr <= #1 8'hff;
  else if(lat_adr)
    ramadr <= #1 adr_mux;
D-----
always @(RS0 or RS1)
  case({RS1,RS0}) // synopsys parallel_case
    0: begin           // bank 1
      r0adr <= #1 8'h00;
      r1adr <= #1 8'h01;
    end
    1: begin           // bank 2
      r0adr <= #1 8'h08;
      r1adr <= #1 8'h09;
    end
    2: begin           // bank 3
      r0adr <= #1 8'h10;
      r1adr <= #1 8'h11;
    end
    3: begin           // bank 4
      r0adr <= #1 8'h18;
      r1adr <= #1 8'h19;
    end
  endcase
F-----
always @(wren or DB or ramadr or r0adr or r1adr or RS0 or
  RS1)
  if (!wren)
    case({RS1,RS0}) // synopsys parallel_case
      0:
        case(ramadr) // synopsys parallel_case
          r0adr:
            r0_1 <= #1 DB; // bank1 - R0
          r1adr:
            r1_1 <= #1 DB; // bank1 - R1
        endcase
      1:
        case(ramadr) // synopsys parallel_case
          r0adr:
            r0_2 <= #1 DB; // bank2 - R0
          r1adr:
            r1_2 <= #1 DB; // bank2 - R1
        endcase
      2:
        case(ramadr) // synopsys parallel_case
          r0adr:
            r0_3 <= #1 DB; // bank3 - R0
          r1adr:
            r1_3 <= #1 DB; // bank3 - R1
        endcase
      3:
        case(ramadr) // synopsys parallel_case
          r0adr:
            r0_4 <= #1 DB; // bank4 - R0
          r1adr:
            r1_4 <= #1 DB; // bank4 - R1
        endcase
    endcase
ramce_8_256_8_8_1_4 ram_mod(.A(ramadr), .CE(1'b0), .DIN(DB),
  .WR(wren),
endmodule
```

Part of Section A and D of the program defines the decode circuitry 414. Section D decodes the RS0 and RS1 signals and decides which bank of the duplicate memory 404 will be performing a write operation. Section F of the program also defines a portion of the decode circuitry 414. Section F basically writes data from the DB bus into an R0 or R1 memory location.

Section B describes the output MUXing of the 8 registers in the duplicate memory 404. The MUXes 418 provide the appropriate address to the address MUX 420. The MUXes 418 are switched with the RS0 and RS1 signals.

Section C basically describes the address MUX 420. The address MUX 420 provides the RAM address (RAMADR) to the RAM 402 to access a particular memory location. Section E also describes and defines an address latch.

The beginning section of the program, section G, declares and defines the various signals as to whether they are inputs, outputs or bidirectional signals. There are wire declarations wherein wire connections are defined.

The H section of the code creates, among other things, an enable to the latch 412 connected to the DA bus. The enable is based on certain signal inputs and click inputs. this section defines other enables such as read enable, write enable for the RAM. Other signals are also defined in section H. Section in and J define some variables and temporary variables for use in the program module.

As is clearly seen, the present invention is significant in the area of microcontrollers and more specifically, in the area of high speed 8051 microcontrollers. The present invention is believed to be especially effective when configured an employed as described herein, however, those skilled in the art will readily recognize that numerous variations and substitutions may be made in the invention and its use and configuration to achieve substantially the same results as achieved by the embodiments and, in particular, the preferred embodiment described herein. Each variation is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A microcontroller circuit, comprising:

a RAM for storing a data address, said RAM having a plurality of storage locations;

an address MUX (multiplexer) for decoding an address and for addressing a particular one of said plurality of storage locations of said RAM;

a decode circuit for determining whether an indirect instruction is to be performed; and an indirect addressing register for duplicatively storing said data address storable in said RAM, said indirect addressing register being connected to said decode circuit;

wherein said indirect addressing register is configured to provide said data address stored in said indirect addressing register to said address MUX responsive to said decode circuit determining that an indirect instruction is to be performed by said microcontroller and wherein said data address provided by said indirect addressing register to said address MUX is directly usable by said address NUX to access said particular one of said plurality of storage locations included in said RAM.

2. The microcontroller of claim 1, wherein said data address stored in said RAM is not read responsive to said indirect instruction being performed by said microcontroller.

3. The microcontroller of claim 1, wherein said address is decoded in a single machine cycle.

4. The microcontroller of claim 1, wherein said microcontroller is designed utilizing only standard Hardware Design Language (HDL) circuit cells.

5. The microcontroller of claim 1, further comprising a latch circuit for latching an address for said decode circuit to read.

6. The microcontroller of claim 1, wherein an indirect instruction performed by said microcontroller will result in a read of said indirect addressing register for determining an address for the particular one of said plurality of storage locations and will also result in a read of said RAM at the determined address for said particular one of the plurality of storage locations.

7. A microcontroller for decoding an indirect instruction, said microcontroller comprising:

a special function register (SFR) for storing data, the special function register including a plurality of memory locations;

a decode circuit for determining whether an indirect instruction is to be performed by said microcontroller; and a plurality of registers connected to said decode circuit, the plurality of registers for storing addresses of at least one of the plurality of memory locations included in said SFR memory;

wherein said indirect instruction includes an address of a first memory location in said SFR, said first memory location including an address of a second memory location in said SFR, and wherein one of said plurality of registers is configured to automatically store said address of said second memory location such that said one of the plurality of registers can provide said address of said second memory location in said SFR responsive to said indirect instruction being executed by said microcontroller.

8. A microcontroller for decoding an indirect instruction in a single machine cycle, said microcontroller comprising:

a memory including a first storage location and a second storage location, said first storage location including said address of said second storage location a decode circuit for determining whether an indirect instruction is being performed by said microcontroller; and a shadow register for providing an address to said memory in response to said decode circuit determining that said indirect instruction requiring indirect memory accessing is being performed by said microcontroller;

wherein said indirect instruction includes an address of said first storage location located in said memory, said first storage location including an address of said second storage location in said memory, and wherein said shadow register is configured to store said address of said second storage location located in said memory such that said shadow register can provide said address of said second storage location in said memory responsive to said indirect instruction being executed by said microcontroller.

9. The microcontroller of claim 8, wherein said memory and said shadow register are independently addressable.

10. The microcontroller of claim 8, wherein said first storage location in said memory is not addressed responsive to said indirect instruction.

11. The microcontroller of claim 8, wherein said second storage location is addressed in a single machine cycle responsive to determining that an indirect instruction is being executed by the microcontroller.

12. The microcontroller of claim 8, wherein said microcontroller is defined by a hardware design language.

13. A microcontroller circuit for processing indirect instructions, the microcontroller comprising:

a first memory including a first storage location and a second storage location, the first storage location for storing an address and the second storage location for storing data, the address stored in the first storage location indicating the address of the second storage location;

a second memory connected to the first memory, said second memory for storing the address stored in the first storage location; and a decode circuit connected to the second memory, the decode circuit for detecting a write to the first storage location included in the first memory, the decode circuit further for detecting an indirect instruction, the indirect instruction including the address of the first storage location;

wherein the address stored in the first storage location is stored in the second memory responsive to the decode circuit detecting the write to said first storage location and wherein responsive to the decode circuit detecting an indirect instruction, the address of the second storage location in the first memory is provided by the second memory in a single machine cycle.

* * * * *

UNITED STATES PATENT AND TRADEMARK OFFICE
CERTIFICATE OF CORRECTION

PATENT NO.    : 6,058,467
DATED         : May 2, 2000
INVENTOR(S)   : Broxterman et al.

It is certified that error appears in the above-identified patent and that said Letters Patent is hereby corrected as shown below:

Title page,
Item [75], add Inventors name -- Wendell L. Little, Denton, Texas --

Column 2,
Line 31, replace "DPTR" with -- DPTR1 --

Column 3,
Line 30, replace "RAMO" with -- RAM0 --

Column 8,
Line 64, after ".WR(wren)," insert -- .DOUT(RAMOUT)); --

Signed and Sealed this

Twenty-second Day of October, 2002

Attest:

Attesting Officer

JAMES E. ROGAN
Director of the United States Patent and Trademark Office